(12) United States Patent
Lee et al.

(10) Patent No.: US 10,324,319 B2
(45) Date of Patent: Jun. 18, 2019

(54) DISPLAY APPARATUS INCLUDING DATA DRIVING INTEGRATED CIRCUITS EACH INCLUDING DUMMY DATA CHANNELS AND A METHOD OF DRIVING THE SAME

(71) Applicant: SAMSUNG DISPLAY CO., LTD., Yongin-si, Gyeonggi-do (KR)

(72) Inventors: Jae-Han Lee, Hwaseong-si (KR); Sun-Koo Kang, Seoul (KR); Taegon Kim, Busan (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 15/671,415

(22) Filed: Aug. 8, 2017

(65) Prior Publication Data

US 2018/0046007 A1 Feb. 15, 2018

(30) Foreign Application Priority Data

Aug. 9, 2016 (KR) .......................... 10-2016-0101477

(51) Int. Cl.
| | | |
|---|---|---|
| G02F 1/133 | (2006.01) | |
| G02F 1/1362 | (2006.01) | |
| G09G 3/3241 | (2016.01) | |
| G09G 3/36 | (2006.01) | |
| G02F 1/1333 | (2006.01) | |

(52) U.S. Cl.
CPC .... G02F 1/13306 (2013.01); G02F 1/136286 (2013.01); G09G 3/3241 (2013.01); G09G 3/3688 (2013.01); G02F 1/13336 (2013.01); G02F 1/136213 (2013.01); G09G 2320/0223 (2013.01)

(58) Field of Classification Search
CPC ............ G02F 1/13306; G02F 1/13336; G02F 1/13621; G09G 2310/0281
See application file for complete search history.

(56) References Cited

U.S. PATENT DOCUMENTS

| | | | |
|---|---|---|---|
| 9,324,764 B2* | 4/2016 | Wang | ................. G02F 1/136286 |
| 9,583,043 B2* | 2/2017 | Mizukoshi | ........... G09G 3/3283 |
| 9,607,581 B2* | 3/2017 | Park | ......................... G09G 5/18 |
| 2007/0009183 A1* | 1/2007 | Kim | ....................... G06F 1/3203 |
| | | | 382/312 |

(Continued)

FOREIGN PATENT DOCUMENTS

| | | |
|---|---|---|
| KR | 1020020057408 | 7/2002 |
| KR | 1020080002564 | 1/2008 |

(Continued)

*Primary Examiner* — Mushfique Siddique
(74) *Attorney, Agent, or Firm* — F. Chau & Associates, LLC

(57) ABSTRACT

A display apparatus includes a display panel, a gate driving part, and a data driving part. The display panel is configured to display an image, and includes a gate line and data lines. The gate driving part is configured to output a gate signal to the gate line. The data driving part includes a plurality of data driving integrated circuit parts. Each of the plurality of data driving integrated circuit parts includes channels, configured to output data signals to the data lines, and a dummy data channel. A sensing pin, configured to receive the gate signal, is formed in each dummy data channel.

16 Claims, 17 Drawing Sheets

(56) References Cited

U.S. PATENT DOCUMENTS

| | | | |
|---|---|---|---|
| 2012/0169578 A1* | 7/2012 | Kim .................... | G09G 3/3688 345/93 |
| 2014/0063023 A1* | 3/2014 | Baek ................... | G09G 1/00 345/501 |
| 2015/0145852 A1* | 5/2015 | Ahn .................... | G09G 3/3677 345/214 |
| 2017/0221443 A1* | 8/2017 | Koh .................... | G09G 3/3688 |
| 2018/0293953 A1* | 10/2018 | Im ..................... | G09G 3/3696 |

FOREIGN PATENT DOCUMENTS

| | | |
|---|---|---|
| KR | 10-0917008 | 9/2009 |
| KR | 1020110073008 | 6/2011 |

\* cited by examiner

DISPLAY APPARATUS INCLUDING DATA DRIVING INTEGRATED CIRCUITS EACH INCLUDING DUMMY DATA CHANNELS AND A METHOD OF DRIVING THE SAME

CROSS-REFERENCE TO RELATED APPLICATION

This application claims priority under 35 U.S.C. § 119 to Korean Patent Application No. 10-2016-0101477, filed on Aug. 9, 2016 in the Korean Intellectual Property Office (KIPO), the disclosure of which is incorporated by reference herein in its entirety.

TECHNICAL FIELD

Exemplary embodiments of the present inventive concept relate to an image display, and more particularly, to a display apparatus and a method of driving the display apparatus.

DISCUSSION OF RELATED ART

A display apparatus includes a display panel and a display panel driving apparatus.

In a liquid crystal display apparatus, the display panel includes a lower substrate, an upper substrate, and a liquid crystal layer disposed therebetween. The lower substrate includes a first base substrate, a gate line, a data line, a thin film transistor formed on the first base substrate, and a pixel electrode electrically connected to the thin film transistor. The upper substrate includes a second base substrate facing the first base substrate, a color filter formed on the second base substrate, and a common electrode formed on the color filter. The liquid crystal layer includes liquid crystal molecules whose arrangement is changed by an electric field generated between the pixel electrode and the common electrode.

The display panel driving apparatus includes a gate driving part, a data driving part, and a timing controlling part. The gate driving part outputs a gate signal to the gate line. The data driving part outputs a data signal to the data line.

When the gate signal is applied to the gate line and thus the thin film transistor is turned on, the data signal applied to the data line is charged in the pixel electrode as a pixel voltage.

However, a delay time of the gate signal increases as a distance between the gate driving part and the gate line increases. Therefore, a charge rate of the pixel voltage decreases as the distance between the gate driving part and the gate line increases. Thus, display quality of the display apparatus may be decreased.

SUMMARY

According to an exemplary embodiment of the present inventive concept, a display apparatus includes a display panel, a gate driving part, and a data driving part. The display panel is configured to display an image, and includes a gate line and data lines. The gate driving part is configured to output a gate signal to the gate line. The data driving part includes a plurality of data driving integrated circuit parts. Each of the plurality of data driving integrated circuit parts includes channels, configured to output data signals to the data lines, and a dummy data channel. A sensing pin, configured to receive the gate signal, is formed in each dummy data channel.

In an exemplary embodiment of the present inventive concept, the dummy data channel may include a first side dummy data channel adjacent to a first side of the channels, and a second side dummy data channel disposed adjacent to a second side of the channel that is opposite to the first side, and the sensing pin may be formed in each of the first side dummy data channel and the second side dummy data channel.

In an exemplary embodiment of the present inventive concept, the display panel may include a dummy data line electrically connected to the dummy data channel of each of the plurality of data driving integrated circuit parts.

In an exemplary embodiment of the present inventive concept, the plurality of data driving integrated circuit parts may include first and second data driving integrated circuit parts that are adjacent to one another, and the second side dummy data channel of the first data driving integrated circuit part and the first side dummy data channel of the second data driving integrated circuit part may be connected to the same dummy data line of the display panel.

In an exemplary embodiment of the present inventive concept, the plurality of data driving integrated circuit parts may include first to N-th (where N is a natural number not less than two) data driving integrated circuit parts, and the dummy data line may include first to (N+1)-th dummy data lines.

In an exemplary embodiment of the present inventive concept, the first dummy data line may be electrically connected to the first side dummy data channel of a first data driving integrated circuit part. The second dummy data line, which is adjacent to the first dummy data line, is electrically connected to the second side dummy data channel of the first data driving integrated circuit part and the first side dummy data channel of the second data driving integrated circuit part, which is adjacent to the first data driving integrated circuit part.

In an exemplary embodiment of the present inventive concept, the (N+1)-th dummy data line may be electrically connected to the second side dummy data channel of the N-th data driving integrated circuit part.

In an exemplary embodiment of the present inventive concept, the data driving part may receive the gate signal of areas where each of the first to (N+1)-th dummy data lines and the gate line cross, through the sensing pin, as received gate signals.

In an exemplary embodiment of the present inventive concept, the data driving part may output the received gate signals as gate feedback signals.

In an exemplary embodiment of the present inventive concept, the display apparatus may further include a gate delay calculating part configured to compare the gate feedback signals, calculate delay times of the received gate signals, and output gate delay data.

In an exemplary embodiment of the present inventive concept, the display apparatus may further include a data output timing setting part configured to output output timing setting data, which automatically sets output timings of the data signals, according to the gate delay data.

In an exemplary embodiment of the present inventive concept, the display apparatus may further include a timing controlling part configured to control a timing of the gate driving part and a timing of the data driving part, and the gate delay calculating part and the data output timing setting part may be included in the timing controlling part.

In an exemplary embodiment of the present inventive concept, the timing controlling part may control the output timings of the data signals output from the channels of the plurality of data driving integrated circuits parts, using delay times of the gate signal of areas where the gate line and two adjacent dummy data lines, connected to each of the plurality of data driving integrated circuit parts, cross.

In an exemplary embodiment of the present inventive concept, the timing controlling part may control output timings of the data signals output from each of the plurality of data driving integrated circuit parts using the delay times of the received gate signals.

In an exemplary embodiment of the present inventive concept, each of the plurality of data driving integrated circuit parts may include first to K-th (where K is a natural number not less than four) channels configured to output first to K-th data signals, respectively. Each of the plurality of data driving integrated circuit parts may sequentially output the first to (K/2)-th data signals through the first to (K/2)-th channels, respectively, and each of the plurality of data driving integrated circuit parts may sequentially output the K-th to (K/2)-th data signals through the K-th to (K/2)-th channels, respectively.

In an exemplary embodiment of the present inventive concept, each of the plurality of data driving integrated circuit parts may include first to K-th (where K is a natural number not less than four) channels configured to output first to K-th data signals, respectively. Each of the plurality of data driving integrated circuit parts sequentially outputs the K-th to first data signals through the K-th to first channels, respectively.

In an exemplary embodiment of the present inventive concept, each of the plurality of data driving integrated circuit parts may include first to K-th (where K is a natural number not less than four) channels configured to output first to K-th data signals, respectively. Each of the plurality of data driving integrated circuit parts sequentially outputs the first to K-th data signals through the first to K-th channels, respectively.

In an exemplary embodiment of the present inventive concept, each of the plurality of data driving integrated circuit parts may include a plurality of channel groups, and output timings of data signals output from each of the plurality of channel groups are different from one another.

In an exemplary embodiment of the present inventive concept, the display panel further may include a dummy gate line disposed between the data driving part and the gate line, the gate driving part may be further configured to output a dummy gate signal to the dummy gate line, and the data driving part may be configured to receive the dummy gate signal through the sensing pin of each of the plurality of data driving integrated circuit parts to measure a delay time of the dummy gate signal.

According to an exemplary embodiment of the present inventive concept, in a method of driving a display apparatus including a display panel in which dummy data lines, data lines, and a gate line are formed, the method includes outputting gate feedback signals by receiving gate signals of areas where the dummy data lines and the gate line cross, outputting gate delay data by comparing the gate feedback signals and calculating delay times of the gate signals, outputting output timing setting data for controlling output timings of data signals using the gate delay data, controlling the outputting timings of the data signals using the output timing setting data to output the data signals to data lines, and outputting a gate signal to the gate line.

According to an exemplary embodiment of the present inventive concept, a display apparatus includes a display panel, a gate driving part, and a data driving part. The display panel is configured to display an image, and includes a gate line, a plurality of data lines, and a plurality of dummy data lines. The gate driving part is configured to output a gate signal to the gate line. The data driving part is configured to output a data signal to the plurality of data lines, and includes a plurality of data driving integrated circuit parts. Each of the plurality of data driving integrated circuit parts is sequentially connected to a first dummy data line, first to K-th (where K is a natural number not less than four) data lines, and a second dummy data line. The first dummy data line and the second dummy data line are included in the plurality of dummy data lines. The first to K-th data lines are included in the plurality of data lines. A sensing pin is formed at an area connected to an intersection point of the gate line and each of the first dummy data line and the second dummy data line of each of the plurality of data driving integrated circuit parts.

BRIEF DESCRIPTION OF THE DRAWINGS

The above and other features of the present inventive concept will become more apparent by describing in detail exemplary embodiments thereof with reference to the accompanying drawings.

DETAILED DESCRIPTION OF THE EMBODIMENTS

Figure 1:
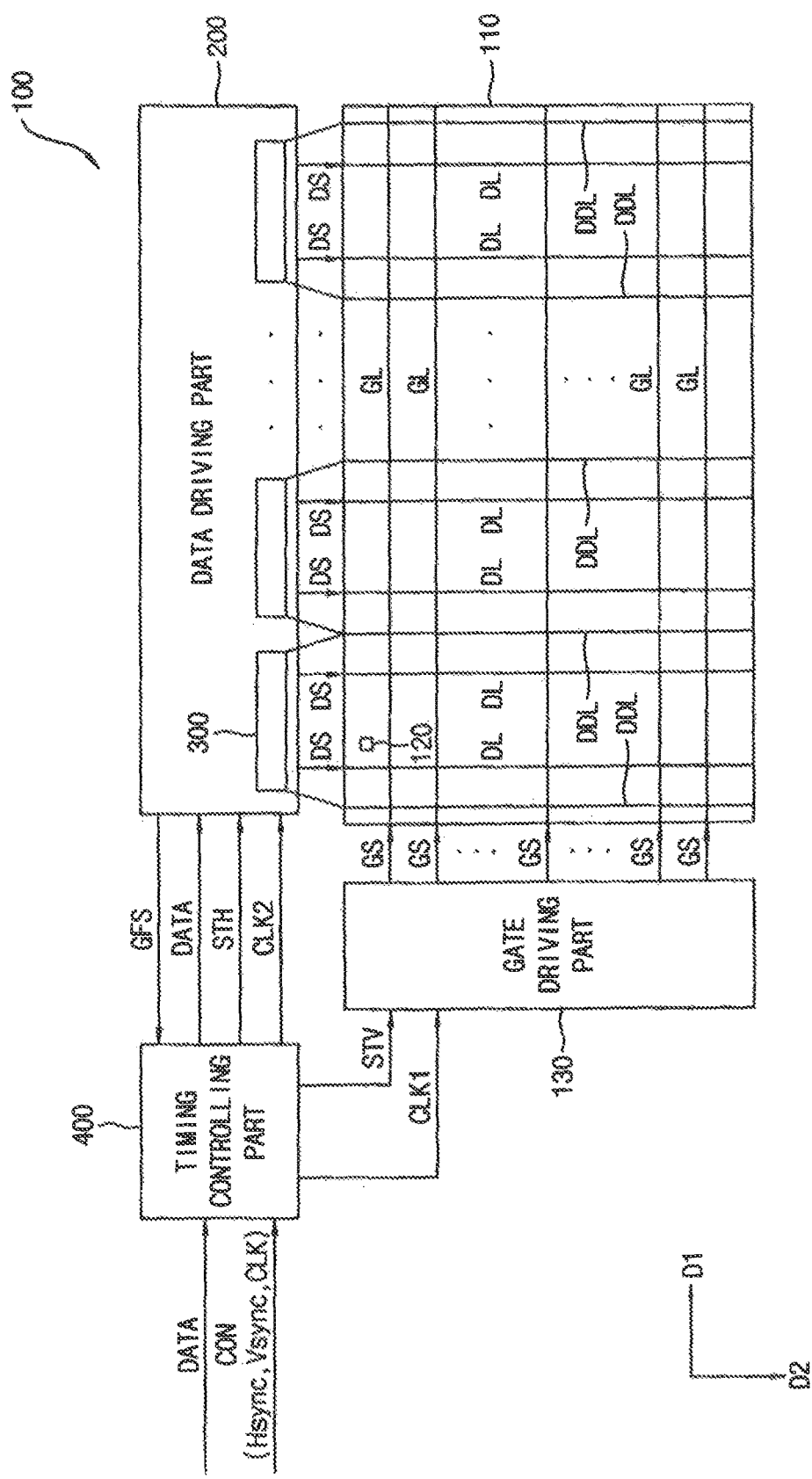
FIG. 1 is a block diagram illustrating a display apparatus according to an exemplary embodiment of the present inventive concept.

Exemplary embodiments of the present inventive concept will be described more fully hereinafter with reference to the accompanying drawings. Like reference numerals may refer to like elements throughout this application.

Exemplary embodiments of the present inventive concept provide a display apparatus capable of increasing display quality thereof.

Exemplary embodiments of the present inventive concept also provide a method of driving the above-mentioned display apparatus.

FIG. 1 is a block diagram illustrating a display apparatus according to an exemplary embodiment of the present inventive concept.

Referring to FIG. 1, a display apparatus 100 according to the present exemplary embodiment includes a display panel 110, a gate driving part 130, a data driving part 200, and a timing controlling part 400.

The display panel 110 receives data signals DS from the data driving part 200 to display an image. The display panel 110 includes gate lines GL, data lines DL, dummy data lines DDL, and pixels 120. The gate lines GL extend in a first direction D1 and are arranged in a second direction D2 that is substantially perpendicular to the first direction D1. The data lines DL extend in the second direction D2 and are arranged in the first direction D1. Here, the first direction D1 may be substantially parallel to a long side of the display panel 110, and the second direction D2 may be substantially parallel to a short side of the display panel 110. The dummy data lines DDL extend in the second direction D2 and are arranged in the first direction D1. The dummy data lines DDL are formed in areas between the data lines DL. Additionally, two of the dummy data lines DDL may be formed at ends of the display panel 110 with respect to the first direction D1.

Figure 2:
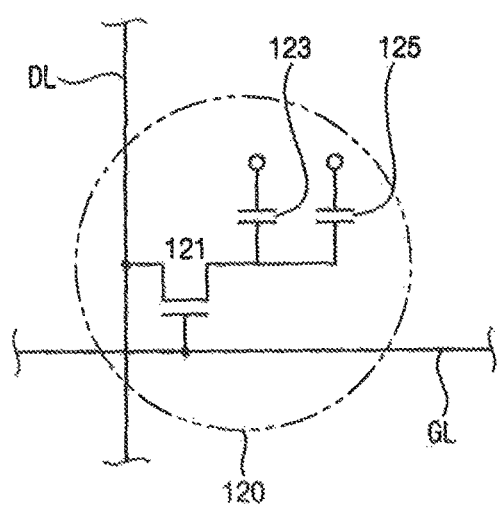
FIG. 2 is a circuit diagram illustrating a pixel of FIG. 1 according to an exemplary embodiment of the present inventive concept.

FIG. 2 is a circuit diagram illustrating a pixel of FIG. 1 according to an exemplary embodiment of the present inventive concept.

Referring to FIGS. 1 and 2, each of the pixels 120 may be defined by one of the gate lines GL and one of the data lines DL. With respect to FIG. 2, one of the pixels 120 will be described with respect to one of the gate lines GL and one of the data lines DL. For example, the pixel 120 may include a thin film transistor 121 electrically connected to the gate line GL and the data line DL, a liquid crystal capacitor 123 connected to the thin film transistor 121, and a storage capacitor 125 connected to the thin film transistor 121. Thus, the display panel 110 may be a liquid crystal display panel.

The gate driving part 130, the data driving part 200, and the timing controlling part 400 may be a display panel driving apparatus for driving the display panel 110.

The gate driving part 130 generates gate signals GS in response to a vertical start signal STV and a first clock signal CLK1 provided from the timing controlling part 400, and outputs the gate signals GS to the gate lines GL.

The data driving part 200 receives image data DATA from the timing controlling part 400, generates the data signals DS based on the image data DATA, and outputs the data signals DS to the data lines DL in response to a horizontal start signal STH and a second clock signal CLK2 provided from the timing controlling part 400. The data driving part 200 may include a plurality of data driving integrated circuit parts 300 which output the data signals DS.

In addition, the data driving part 200 outputs the gate signals GS, of areas where each of the dummy data lines DDL and at least one of the gate lines GL cross, to the timing controlling part 400, as gate feedback signals GFS.

The timing controlling part 400 receives the image data DATA and a control signal CON from an outside source (e.g., a host). The control signal CON may include a horizontal synchronous signal Hsync, a vertical synchronous signal Vsync, and a clock signal CLK. The timing controlling part 400 generates the horizontal start signal STH using the horizontal synchronous signal Hsync and outputs the horizontal start signal STH to the data driving part 200. In addition, the timing controlling part 400 generates the vertical start signal STV using the vertical synchronous signal Vsync and outputs the vertical start signal STV to the gate driving part 130. Furthermore, the timing controlling part 400 generates the first clock signal CLK1 and the second clock signal CLK2 using the clock signal CLK, outputs the first clock signal CLK1 to the gate driving part 130, and outputs the second clock signal CLK2 to the data driving part 200.

The timing controlling part 400 receives the gate feedback signals GFS, and controls output timings of the data driving part 200 using the gate feedback signals GFS.

Figure 3:
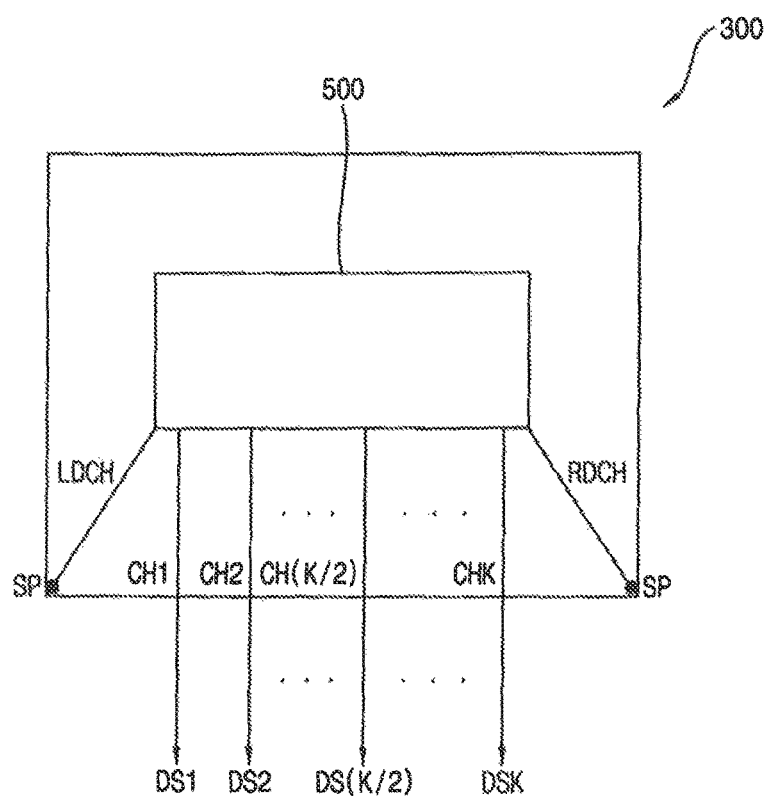
FIG. 3 is a block diagram illustrating a data driving integrated circuit part of FIG. 1 according to an exemplary embodiment of the present inventive concept.

FIG. 3 is a block diagram illustrating a data driving integrated circuit part of FIG. 1 according to an exemplary embodiment of the present inventive concept.

Referring to FIGS. 1 and 3, each of the plurality of data driving integrated circuit parts 300 includes a data driving integrated circuit 500, first to K-th (where K is a natural number not less than four) channels, a left dummy data channel LDCH, a right dummy data channel RDCH, and sensing pins SP. For example, the data driving integrated circuit part 300 may have a Chip On Film (COF) type.

The data driving integrated circuit 500 outputs first to K-th data signals DS1, DS2, . . . , DS(K/2), . . . , and DSK through first to K-th channels CH1, CH2, . . . , CH(K/2), . . . , and CHK, respectively. The first to K-th data signals DS1, DS2, . . . , DS(K/2), . . . , and DSK may be included in the data signals DS.

The left dummy data channel LDCH is disposed on a first side of the first to K-th channels CH1, CH2, . . . , CH(K/2), . . . , and CHK. Thus, the left dummy data channel LDCH may be referred to as a first side dummy data channel. The left dummy data channel LDCH is electrically connected to one of the dummy data lines DDL formed in the display panel 110.

The right dummy data channel RDCH is disposed on a second side, opposite to the first side, of the first to K-th channels CH1, CH2, . . . , CH(K/2), . . . , and CHK. Thus, the right dummy data channel RDCH may be referred to as a second side dummy data channel. The right dummy data channel RDCH is electrically connected to one of the dummy data lines DDL formed in the display panel 110.

The sensing pin SP is formed in each of the left dummy data channel LDCH and the right dummy data channel RDCH. The sensing pin SP may be a pin for receiving the gate signals GS of an area where the corresponding dummy data line DDL and at least one of the gate lines GL cross to measure a delay time thereof.

Figure 4:
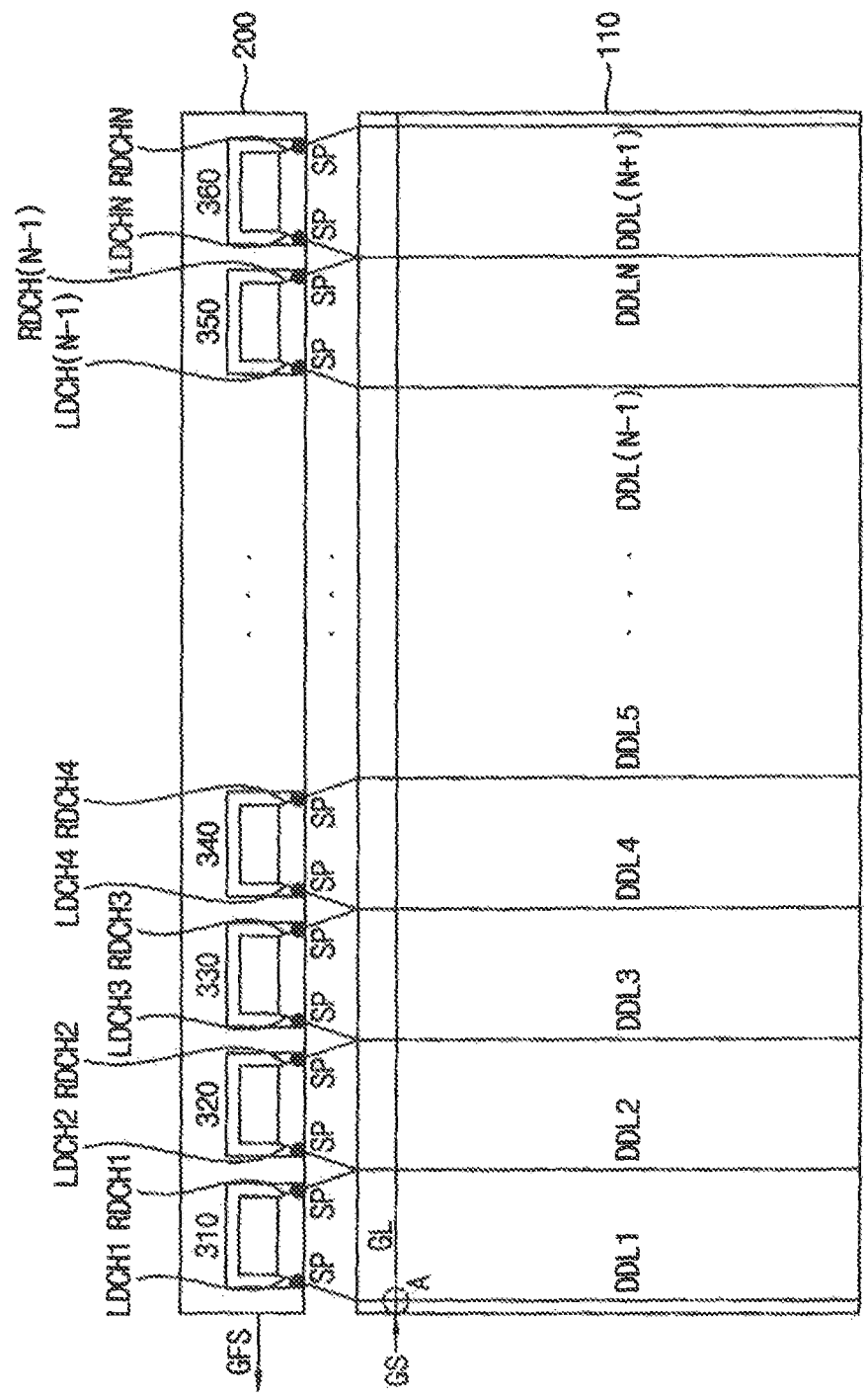
FIG. 4 is a block diagram illustrating a display panel and a data driving part of FIG. 1 according to an exemplary embodiment of the present inventive concept.

FIG. 4 is a block diagram illustrating a display panel and a data driving part of FIG. 1 according to an exemplary embodiment of the present inventive concept.

Referring to FIGS. 1, 3, and 4, the dummy data lines DDL include first to (N+1)-th dummy data lines DDL1, DDL2, DDL3, DDL4, DDL5, . . . , DDL(N−1), DDLN, and DDL(N+1).

The data driving integrated circuit parts 300 include first to N-th data driving integrated circuit parts 310, 320, 330, 340, 350, and 360. Each of the first to N-th data driving integrated circuit parts 310, 320, 330, 340, 350, and 360 may be substantially the same as the data driving integrated circuit part 300 of FIG. 3.

Thus, a first data driving integrated circuit part 310 includes a first left dummy data channel LDCH1 and a first right dummy data channel RDCH1. The sensing pin SP is formed in each of the first left dummy data channel LDCH1 and the first right dummy data channel RDCH1. The first left dummy data channel LDCH1 is connected to the first dummy data line DDL1. The first right dummy data channel RDCH1 is connected to the second dummy data line DDL2.

A second data driving integrated circuit part 320 includes a second left dummy data channel LDCH2 and a second right dummy data channel RDCH2. The sensing pin SP is formed in each of the second left dummy data channel LDCH2 and the second right dummy data channel RDCH2. The second left dummy data channel LDCH2 is connected to the second dummy data line DDL2. The second right dummy data channel RDCH2 is connected to the third dummy data line DDL3.

A third data driving integrated circuit part 330 includes a third left dummy data channel LDCH3 and a third right dummy data channel RDCH3. The sensing pin SP is formed in each of the third left dummy data channel LDCH3 and the third right dummy data channel RDCH3. The third left dummy data channel LDCH3 is connected to the third dummy data line DDL3. The third right dummy data channel RDCH3 is connected to the fourth dummy data line DDL4.

A fourth data driving integrated circuit part 340 includes a fourth left dummy data channel LDCH4 and a fourth right dummy data channel RDCH4. The sensing pin SP is formed in each of the fourth left dummy data channel LDCH4 and the fourth right dummy data channel RDCH4. The fourth left dummy data channel LDCH4 is connected to the fourth dummy data line DDL4. The fourth right dummy data channel RDCH4 is connected to the fifth dummy data line DDL5.

An (N−1)-th data driving integrated circuit part 350 includes an (N−1)-th left dummy data channel LDCH(N−1) and an (N−1)-th right dummy data channel RDCH(N−1). The sensing pin SP is formed in each of the (N−1)-th left dummy data channel LDCH(N−1) and the (N−1)-th right dummy data channel RDCH(N−1). The (N−1)-th left dummy data channel LDCH(N−1) is connected to the (N−1)-th dummy data line DDL(N−1). The (N−1)-th right dummy data channel RDCH(N−1) is connected to the N-th dummy data line DDLN.

An N-th data driving integrated circuit part 360 includes an N-th left dummy data channel LDCHN and an N-th right dummy data channel RDCHN. The sensing pin SP is formed in each of the N-th left dummy data channel LDCHN and the N-th right dummy data channel RDCHN. The N-th left dummy data channel LDCHN is connected to the N-th dummy data line DDLN. The N-th right dummy data channel RDCHN is connected to the (N+1)-th dummy data line DDL(N+1).

Figure 5:
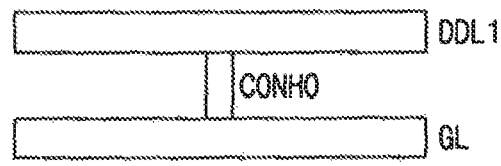
FIG. 5 is a cross-sectional view of a portion 'A' of the display panel of FIG. 4 according to an exemplary embodiment of the present inventive concept.

FIG. 5 is a cross-sectional view of a portion 'A' of the display panel of FIG. 4 according to an exemplary embodiment of the present inventive concept.

Referring to FIGS. 1, 4, and 5, a contact hole CONHO is formed between the gate line GL and the first dummy data line DDL1. In substantially the same manner, a contact hole is formed between the gate line GL and each of the second to (N+1)-th dummy data lines DDL2, DDL3, DDL4, DDL5, . . . , DDL(N−1), DDLN, and DDL(N+1).

Thus, the data driving part 200 may receive the gate signals GS of the areas where the gate line GL and each of the first to (N+1)-th dummy data lines DDL1, DDL2, DDL3, DDL4, DDL5, . . . , DDL(N−1), DDLN, and DDL(N+1) cross, through the sensing pins SP, and may output the gate signals GS as the gate feedback signals GFS.

Figure 6:
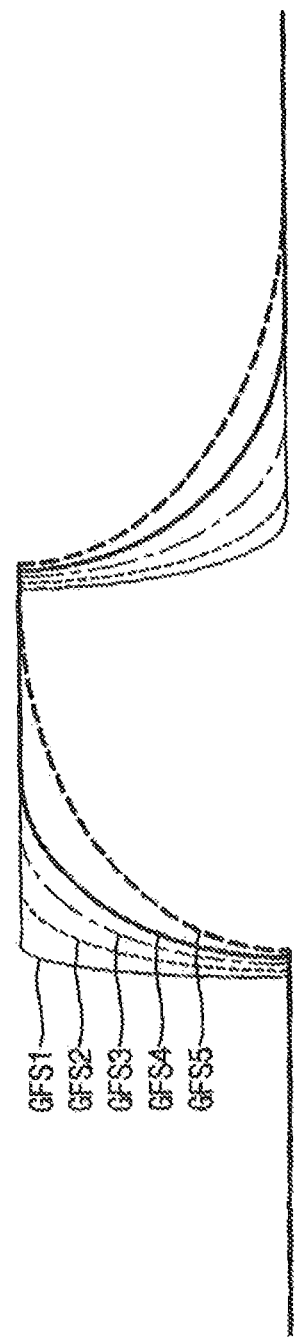
FIG. 6 is waveform diagram illustrating gate feedback signals of FIG. 4 according to an exemplary embodiment of the present inventive concept.

FIG. 6 is waveform diagram illustrating gate feedback signals of FIG. 4 according to an exemplary embodiment of the present inventive concept.

Referring to FIGS. 1, 4, and 6, the gate feedback signals GFS may include a first gate feedback signal GFS1, a second gate feedback signal GFS2, a third gate feedback signal GFS3, a fourth gate feedback signal GFS4, and a fifth gate feedback signal GFS5.

A time when the gate signal GS transitions from a low level to a high level is increasingly delayed as a load of the gate line GL increases. Thus, a delay time of the gate signal GS increases as a distance between the gate driving part 130 and the gate line GL increases (e.g., as illustrated in FIG. 6 with respect to the first to fifth gate feedback signals GFS1 to GFS5).

For example, the first gate feedback signal GFS1 may be the gate signal GS of an area where the first dummy data line DDL1 and the gate line GL cross. The second gate feedback signal GFS2 may be the gate signal GS of an area where the second dummy data line DDL2 and the gate line GL cross. The third gate feedback signal GFS3 may be the gate signal GS of an area where the third dummy data line DDL3 and the gate line GL cross. The fourth gate feedback signal GFS4 may be the gate signal GS of an area where the fourth dummy data line DDL4 and the gate line GL cross. The fifth gate feedback signal GFS5 may be the gate signal GS of an area where the fifth dummy data line DDL5 and the gate line GL cross.

Figure 7:
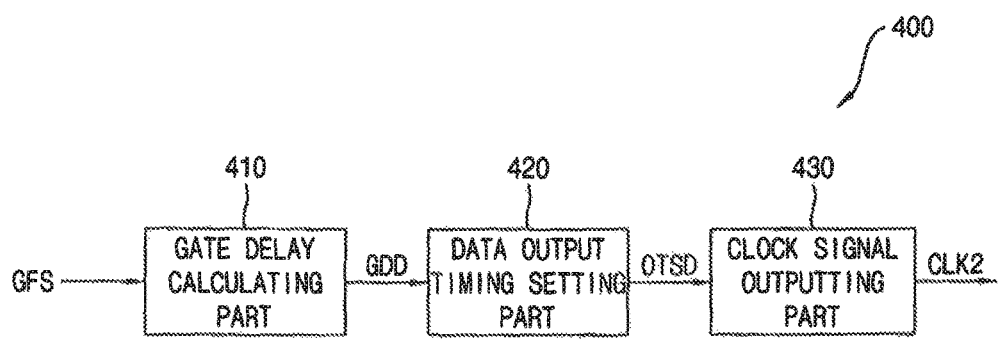
FIG. 7 is a block diagram illustrating a timing controlling part of FIG. 1 according to an exemplary embodiment of the present inventive concept.

FIG. 7 is a block diagram illustrating a timing controlling part of FIG. 1 according to an exemplary embodiment of the present inventive concept.

Referring to FIGS. 1 and 3 to 7, the timing controlling part 400 includes a gate delay calculating part 410, a data output timing setting part 420, and a clock outputting part 430.

The gate delay calculating part 410 receives the gate feedback signals GFS output from the data driving part 200. The gate delay calculating part 410 compares the gate feedback signals GFS with one another, and calculates delay times of the gate signals GS of the gate line GL which crosses with each of the first to (N+1)-th dummy data lines DDL1, DDL2, DDL3, DDL4, DDL5, . . . , DDL(N−1), DDLN, and DDL(N+1). The gate delay calculating part 410 outputs gate delay data GDD indicating the delay times of the gate signals GS.

The data output timing setting part 420 receives the gate delay data GDD from the gate delay calculating part 410. According to the gate delay data GDD, the data output timing setting part 420 automatically sets output timings of the first to K-th data signals DS1, DS2, . . . , DS(K/2), . . . , and DSK output from the first to K-th channels CH1, CH2, . . . , CH(K/2), . . . , and CHK, respectively, of each of the data driving integrated circuit parts 300 included in the data driving part 200. The data output timing setting part 420 outputs output timing setting data OTSD for automatically setting the output timings of the first to K-th data signals DS1, DS2, . . . , DS(K/2), . . . , and DSK.

The clock outputting part 430 receives the output timing setting data OTSD from the data output timing setting part 420. The clock outputting part 430 outputs the second clock signal CLK2 for controlling the output timing of the data driving part 200 according to the output timing setting data OTSD.

For each of the data driving integrated circuit parts 300, the timing controlling part 400 may control the output timings of the first to K-th data signals DS1, DS2, . . . , DS(K/2), . . . , and DSK output from the first to K-th channels CH1, CH2, . . . , CH(K/2), . . . , and CHK, respectively, based on delay times of the gate signals GS of areas where the gate line GL and each of two adjacent dummy data lines DDL, connected to the data driving integrated circuit part 300, cross. For example, the timing controlling part 400 may control output timings of first to K-th data signals DS1, DS2, . . . , DS(K/2), . . . , and DSK output from first to K-th channels CH1, CH2, . . . , CH(K/2), . . . , and CHK, respectively, of the first data driving integrated circuit part 310, using a delay time of the gate signal GS of an area where the gate line GL and the first dummy data line DDL1 cross, and a delay time of the gate signal GS of an area where the gate line GL and the second dummy data line DDL2 cross. The timing controlling part 400 may similarly control output timings for the second to N-th data driving integrated circuit parts 320 to 360. The delay time of the gate signal GS increases as the load of the gate line GL increases. Therefore, each of the first to N-th data driving integrated circuit parts 310, 320, 330, 340, 350, and 360 may sequentially output the first to K-th data signals DS1, DS2, . . . , DS(K/2), . . . , and DSK in consideration of the delay time.

Figure 8:
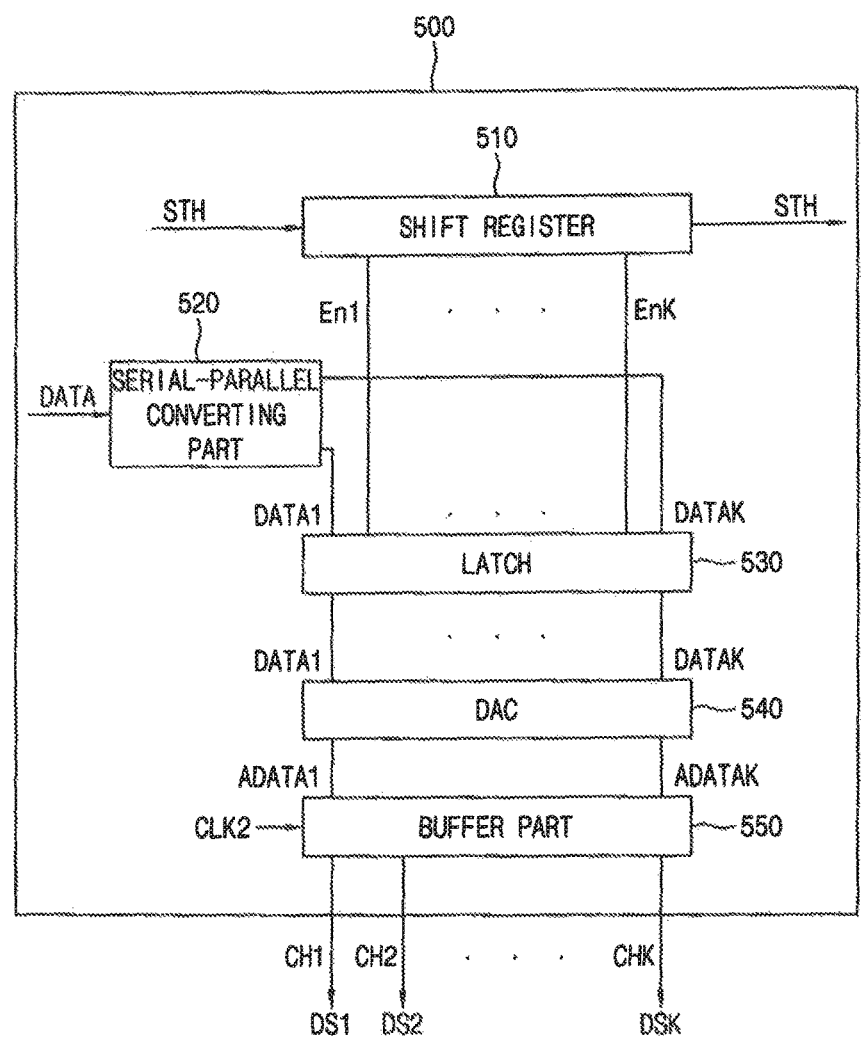
FIG. 8 is a block diagram illustrating a data driving integrated circuit of FIG. 3 according to an exemplary embodiment of the present inventive concept.

FIG. 8 is a block diagram illustrating a data driving integrated circuit of FIG. 3 according to an exemplary embodiment of the present inventive concept.

Referring to FIGS. 1 and 3 to 8, the data driving integrated circuit 500 includes a shift register 510, a serial-parallel converting part 520, a latch 530, a digital-analog converting part 540, and a buffer part 550.

The shift register 510 receives the horizontal start signal STH, and shifts the horizontal start signal STH to a next data driving integrated circuit. In addition, the shift register 510 sequentially provides first to K-th parallel data DATA1, . . . , and DATAK to the latch 530. For example, the shift register 510 sequentially outputs first to K-th enable signals En1, . . . , and Enk to sequentially store the first to K-th parallel data DATA1, . . . , and DATAK in the latch 530.

The serial-parallel converting part 520 receives the image data DATA, converts the image data DATA into the first to K-th parallel data DATA1, . . . , and DATAK, and outputs the first to K-th parallel data DATA1, . . . , and DATAK to the latch 530.

The latch 530 outputs the first to K-th parallel data DATA1, . . . , and DATAK to the digital-analog converting part 540.

The digital-analog converting part 540 converts the first to K-th parallel data DATA1, . . . , and DATAK into first to K-th analog data ADATA1, . . . , and ADATAK, and outputs the first to K-th analog data ADATA1, . . . , and ADATAK to the buffer part 550.

The buffer part 550 amplifies the first to K-th analog data ADATA1, . . . , and ADATAK, and outputs the first to K-th data signals DS1, DS2, . . . , DS(K/2), . . . , and DSK through the first to K-th channels CH1, CH2, . . . , CH(K/2), . . . , and CHK, respectively. The second clock signal CLK2, which is controlled according to the output timing setting data OTSD, is applied to the buffer part 550. Thus, the buffer part 550 may output the first to K-th data signals DS1, DS2, . . . , DS(K/2), . . . , and DSK in consideration of the delay time of the gate signal GS.

Figure 9:
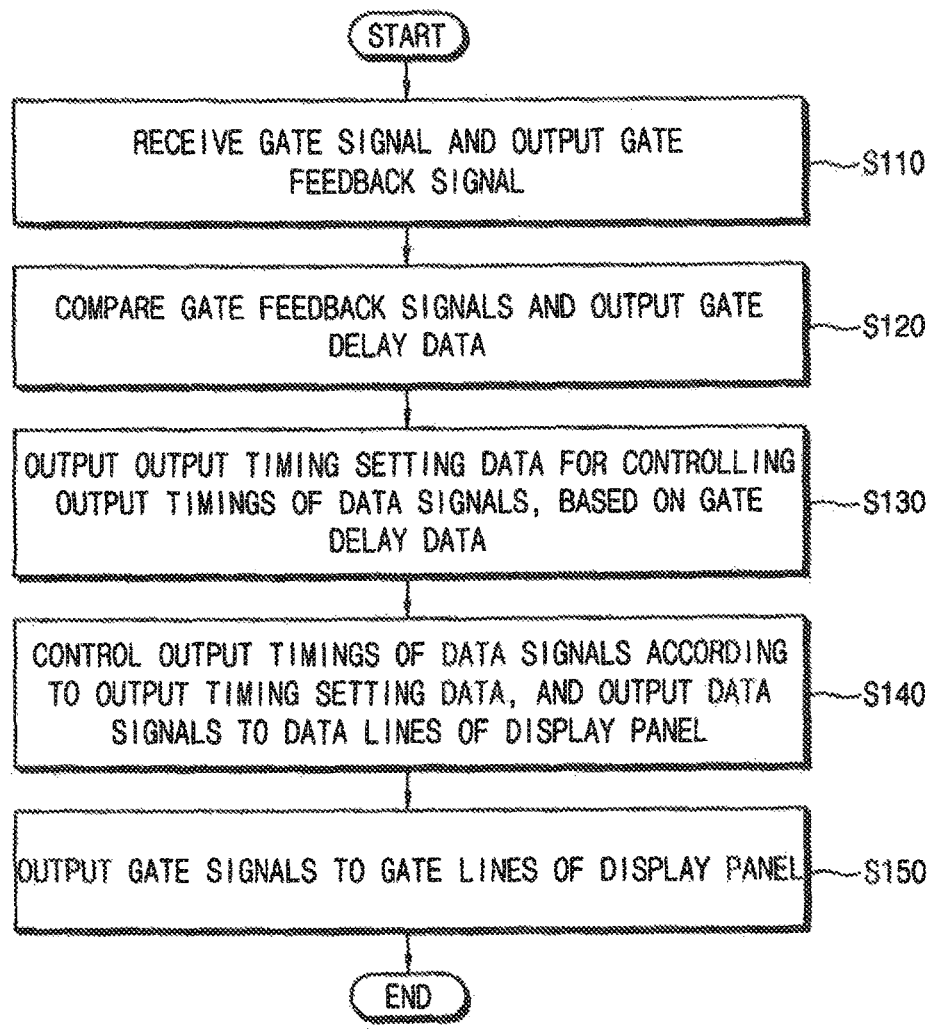
FIG. 9 is a flowchart illustrating a method of driving the display apparatus of FIG. 1 according to an exemplary embodiment of the present inventive concept.

FIG. 9 is a flowchart illustrating a method of driving the display apparatus of FIG. 1 according to an exemplary embodiment of the present inventive concept.

Referring to FIGS. 1 and 3 to 9, the gate signals GS are received and the gate feedback signals GFS are output (operation S110). For example, the data driving part 200 receives the gate signals GS of the areas where the gate line GL and each of the first to (N+1)-th dummy data lines DDL1, DDL2, DDL3, DDL4, DDL5, . . . , DDL(N−1), DDLN, and DDL(N+1) cross, through the sensing pins SP, and outputs the gate signals GS as the gate feedback signals GFS.

The gate feedback signals GFS are compared and the gate delay data GDD is output (operation S120). For example, the gate delay calculating part 410 receives the gate feedback signals GFS output from the data driving part 200. The gate delay calculating part 410 compares the gate feedback signals GFS, and calculates the delay times of the gate signals GS of the gate line GL which crosses with each of the first to (N+1)-th dummy data lines DDL1, DDL2, DDL3, DDL4, DDL5, . . . , DDL(N−1), DDLN, and DDL(N+1). The gate delay calculating part 410 outputs the gate delay data GDD that indicates the delay times of the gate signals GS.

The output timing setting data OTSD, for controlling the output timings of the data signals DS based on the gate delay data GDD, is output (operation S130). For example, the data output timing setting part 420 receives the gate delay data GDD from the gate delay calculating part 410. According to the gate delay data GDD, the data output timing setting part 420 outputs the output timing setting data OTSD for automatically setting the output timings of the first to K-th data signals DS1, DS2, . . . , DS(K/2), . . . , and DSK output from the first to K-th channels CH1, CH2, . . . , CH(K/2), . . . , and CHK, respectively, of each of the data driving integrated circuit parts 300 included in the data driving part 200.

The output timings of the data signals DS are controlled according to the output timing setting data OTSD, and the data signals DS are output to the data lines DL of the display panel 110 (operation S140). For example, the clock outputting part 430 receives the output timing setting data OTSD from the data output timing setting part 420. The clock outputting part 430 outputs the second clock signal CLK2 to control the output timing of the data driving part 200 according to the output timing setting data OTSD. The data driving part 200 receives the image data DATA from the timing controlling part 400, generates the data signals DS based on the image data DATA, and outputs the data signals DS to the data lines DL in response to the horizontal start signal STH and the second clock signal CLK2 provided from the timing controlling part 400.

The gate signals GS are output to the gate lines GL of the display panel 110 (operation S150). For example, the gate driving part 130 generates the gate signals GS in response to the vertical start signal STV and the first clock signal CLK1 provided from the timing controlling part 400, and outputs the gate signals GS to the gate lines GL.

Figure 10:
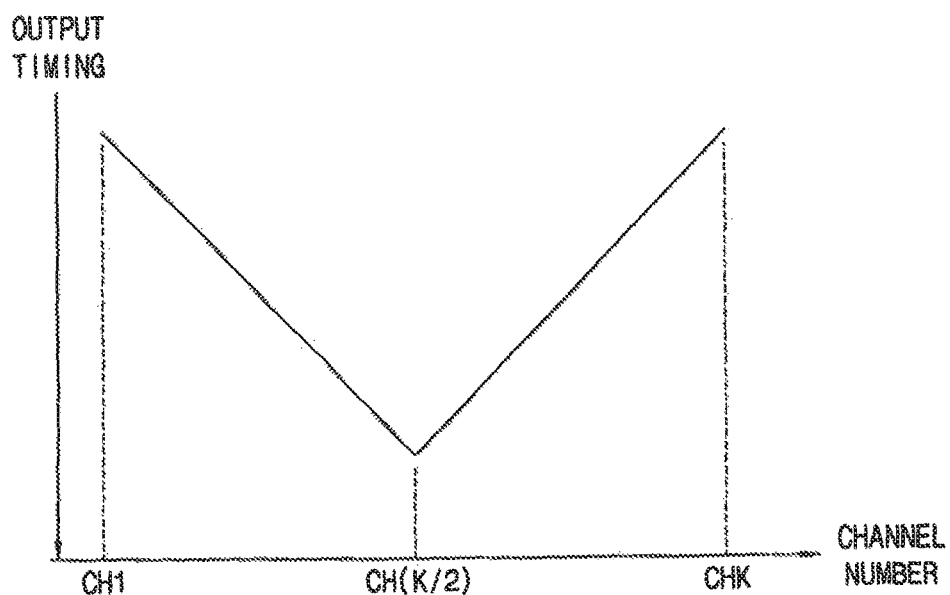
FIG. 10 is a graph illustrating output timings of channels outputting data signals according to an exemplary embodiment of the present inventive concept.

FIG. 10 is a graph illustrating output timings of channels outputting data signals according to an exemplary embodiment of the present inventive concept.

The channels CH1, . . . , CH(K/2), . . . , and CHK, according to the present exemplary embodiment illustrated in FIG. 10, may be included in the data driving integrated circuit part 300 of FIG. 3.

Referring to FIGS. 3 and 10, the data driving integrated circuit part 300 may sequentially output the first to (K/2)-th data signals DS1, . . . , and DS(K/2) through the first to (K/2)-th data channels CH1, . . . , and CH(K/2), respectively. Output timings of the first to (K/2)-th data signals DS1, . . . , and DS(K/2) may be linearly changed.

In addition, the data driving integrated circuit part 300 may sequentially output the K-th to (K/2)-th data signals DSK, . . . , DS(K/2) through the K-th to (K/2)-th channels CHK, . . . , and CH(K/2). Output timings of the K-th to (K/2)-th data signals DSK, . . . , DS(K/2) may be linearly changed.

Figure 11:
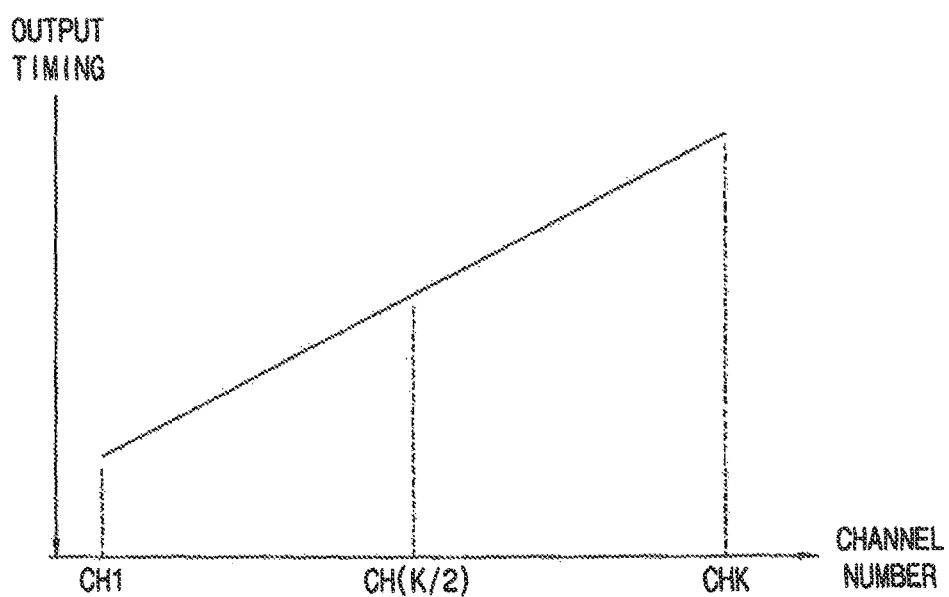
FIG. 11 is a graph illustrating output timings of channels outputting data signals according to an exemplary embodiment of the present inventive concept.

FIG. 11 is a graph illustrating output timings of channels outputting data signals according to an exemplary embodiment of the present inventive concept.

The channels CH1, . . . , CH(K/2), . . . , and CHK, according to the present exemplary embodiment illustrated in FIG. 11, may be included in the data driving integrated circuit part 300 of FIG. 3.

Referring to FIGS. 3 and 11, the data driving integrated circuit part 300 may sequentially output the K-th to first data signals DSK, . . . , DS(K/2), . . . , and DS1 through the K-th to first channels CHK, . . . , CH(K/2), . . . , and CH1, respectively. Output timings of the K-th to first data signals DSK, . . . , DS(K/2), . . . , and DS1 may be linearly changed.

Figure 12:
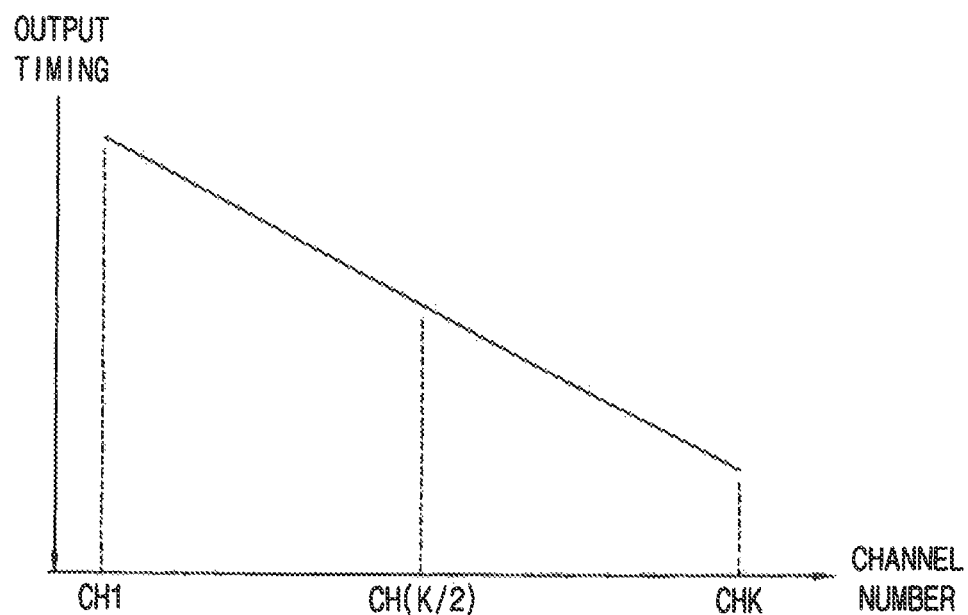
FIG. 12 is a graph illustrating output timings of channels outputting data signals according to an exemplary embodiment of the present inventive concept.

FIG. 12 is a graph illustrating output timings of channels outputting data signals according to an exemplary embodiment of the present inventive concept.

The channels CH1, . . . , CH(K/2), . . . , and CHK, according to the present exemplary embodiment illustrated in FIG. 12, may be included in the data driving integrated circuit part 300 of FIG. 3.

Referring to FIGS. 3 and 11, the data driving integrated circuit part 300 may sequentially output the first to K-th data signals DS1, . . . , DS(K/2), . . . , and DSK through the first to K-th channels CH1, . . . , CH(K/2), . . . , and CHK, respectively. Output timings of the first to K-th data signals DS1, . . . , DS(K/2), . . . , and DSK may be linearly changed.

Figure 13:
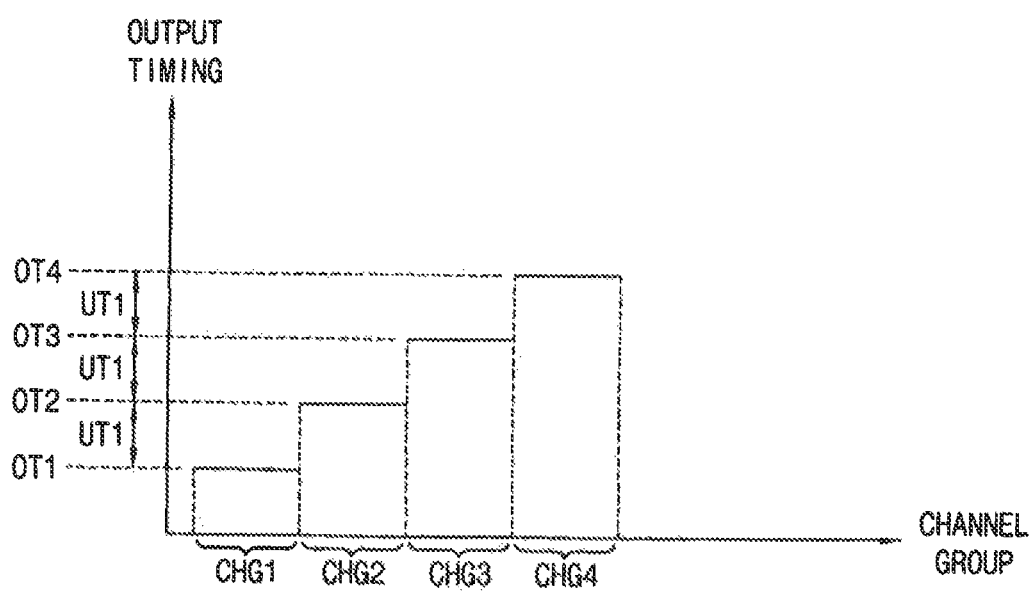
FIG. 13 is a graph illustrating output timings of channel groups outputting data signals according to an exemplary embodiment of the present inventive concept.

FIG. 13 is a graph illustrating output timings of channel groups outputting data signals according to an exemplary embodiment of the present inventive concept.

Channel groups CHG1, CHG2, CHG3, and CHG4, according to the present exemplary embodiment illustrated in FIG. 13, may be included in the data driving integrated circuit part 300 of FIG. 3.

Referring to FIGS. 3 and 13, the first to K-th channels CH1, CH2, . . . , CH(K/2), . . . , and CHK of the data driving integrated circuit part 300 may be divided into the channel groups CHG1, CHG2, CHG3, and CHG4. For example, each of the channel groups CHG1, CHG2, CHG3, and CHG4 may include J (where J is a natural number not less than two) channels. For example, each of the channel groups CHG1, CHG2, CHG3, and CHG4 may include 12 channels.

Each of the output timings of data signals output from the first channel group CHG1 may be a first output timing OT1. Each of output timings of data signals output from the second channel group CHG2 may be a second output timing OT2. The second output timing OT2 may be later than the first output timing OT1 by one unit time UT1. Each of output timings of data signals output from the third channel group CHG3 may be a third output timing OT3. The third output timing OT3 may be later than the second output timing OT2 by one unit time UT1. Each of output timings of data signals output from the fourth channel group CHG4 may be a fourth output timing OT4. The fourth output timing OT4 may be later than the third output timing OT3 by one unit time UT1.

The following Table 1 shows the output timing setting data OTSD of FIG. 7 for setting the first output timing OT1, the second output timing OT2, the third output timing OT3, and the fourth output timing OT4.

TABLE 1

| Output timing setting data (OTSD) | Output timing |
| --- | --- |
| 00 | First output timing OT1 |
| 01 | Second output timing OT2 |
| 10 | Third output timing OT3 |
| 11 | Fourth output timing OT4 |

Referring to FIGS. 1, 3, 7, 13, and Table 1, when the output timing setting data OTSD is '00', the data driving integrated circuit part 300 may output the data signal DS at the first output timing OT1. When the output timing setting data OTSD is '01', the data driving integrated circuit part 300 may output the data signal DS at the second output timing OT2. When the output timing setting data OTSD is '10', the data driving integrated circuit part 300 may output the data signal DS at the third output timing OT3. When the output timing setting data OTSD is '11', the data driving integrated circuit part 300 may output the data signal DS at the fourth output timing OT4.

Figure 14:
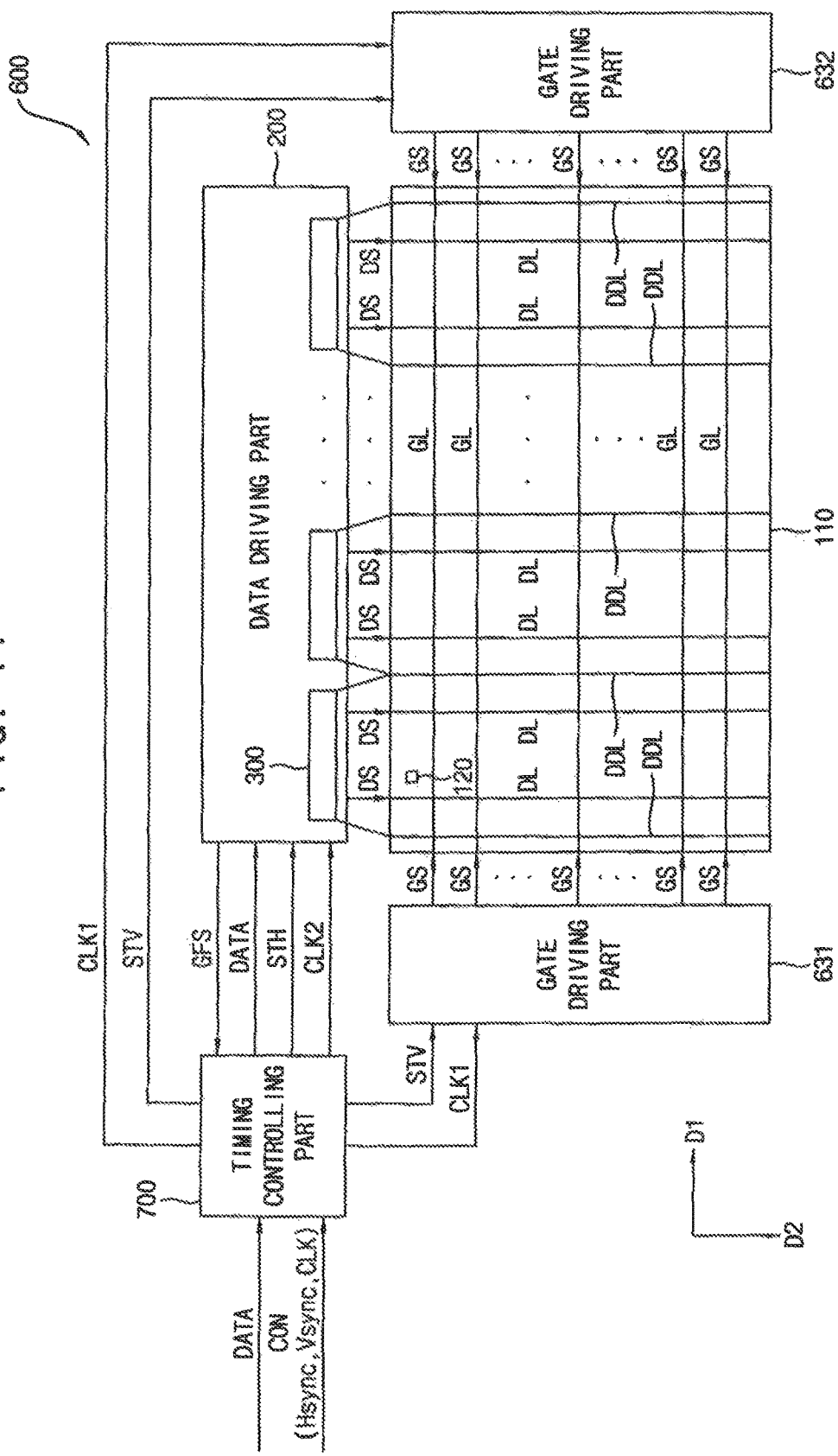
FIG. 14 is a block diagram illustrating a display apparatus according to an exemplary embodiment of the present inventive concept.

FIG. 14 is a block diagram illustrating a display apparatus according to an exemplary embodiment of the present inventive concept.

A display apparatus 600, according to the present exemplary embodiment illustrated in FIG. 14, may be substantially the same as the display apparatus 100 of FIG. 1, except for a first gate driving part 631, a second gate driving part 632, and a timing controlling part 700. Thus, the same reference numerals will be used to refer to same or like parts as those described previously, and any repeat explanations concerning these elements will be omitted.

Referring to FIG. 14, the display apparatus 600 includes the display panel 110, the first gate driving part 631, the second gate driving part 632, the data driving part 200, and the timing controlling part 700.

The first gate driving part 631 is disposed adjacent to a first end of the gate lines GL. The first gate driving part 631 generates the gate signals GS in response to the vertical start signal STV and the first clock signal CLK1 provided from the timing controlling part 700, and outputs the gate signals GS to the gate lines GL.

The second gate driving part 632 is disposed adjacent to a second end of the gate lines GL. The second gate driving part 632 generates the gate signals GS in response to the vertical start signal STV and the first clock signal CLK1 provided from the timing controlling part 700, and outputs the gate signals GS to the gate lines GL.

The data driving part 200 receives the image data DATA from the timing controlling part 700, generates the data signals DS based on the image data DATA, and outputs the data signals DS to the data lines DL in response to the horizontal start signal STH and the second clock signal CLK2 provided from the timing controlling part 700. In addition, the data driving part 700 outputs the gate signals GS, of the areas where each of the dummy data lines DDL and at least one of the gate lines GL cross, to the timing controlling part 700, as the gate feedback signals GFS.

The timing controlling part 700 receives the image data DATA and the control signal CON from an outside source (e.g., a host). The control signal CON may include the horizontal synchronous signal Hsync, the vertical synchronous signal Vsync, and the clock signal CLK. The timing controlling part 700 generates the horizontal start signal STH using the horizontal synchronous signal Hsync and outputs the horizontal start signal STH to the data driving part 200. In addition, the timing controlling part 700 generates the vertical start signal STV using the vertical synchronous signal Vsync and outputs the vertical start signal STV to the first gate driving part 631 and the second gate driving part 632. Furthermore, the timing controlling part 700 generates the first clock signal CLK1 and the second clock signal CLK2 using the clock signal CLK, outputs the first clock signal CLK1 to the first gate driving part 631 and the second gate driving part 632, and outputs the second clock signal CLK2 to the data driving part 200.

The timing controlling part 700 receives the gate feedback signals GFS, and controls output timings of the data driving part 200 using the gate feedback signals GFS. For example, the timing controlling part 700 may include the gate delay calculating part 410, the data output timing setting part 420, and the clock signal outputting part 430 of FIG. 7.

Figure 15:
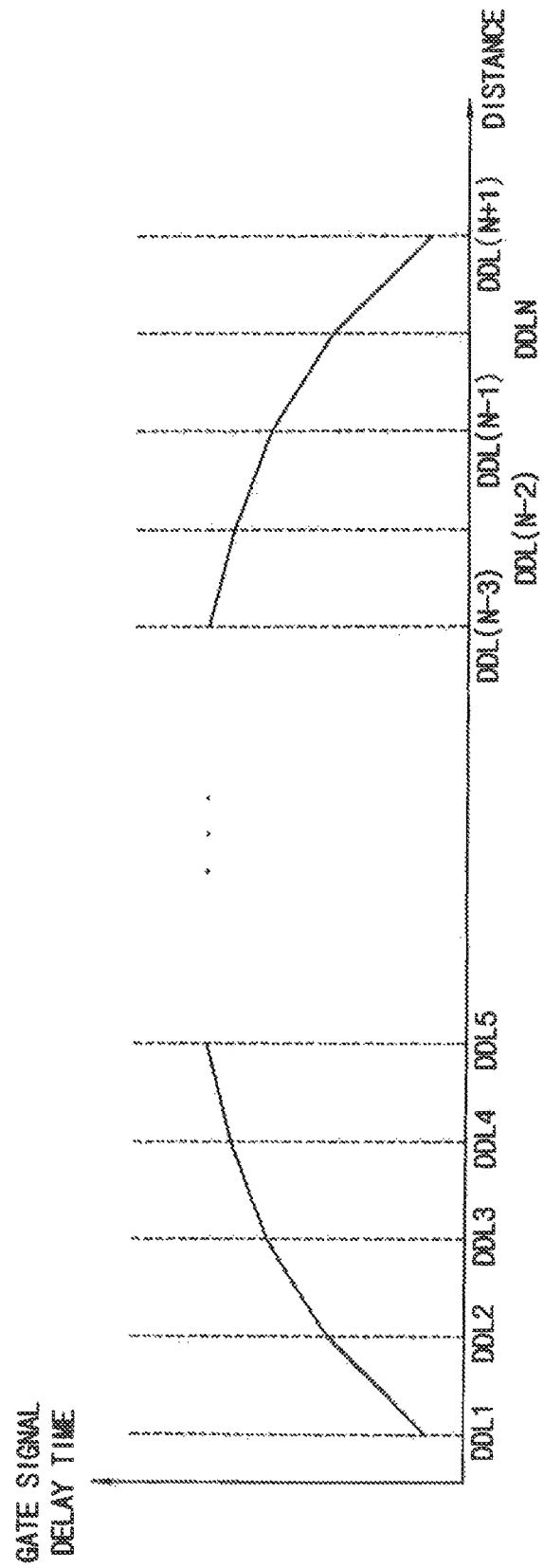
FIG. 15 is a graph illustrating a relationship between a gate signal delay time and a distance from a first gate driving part of FIG. 14 according to an exemplary embodiment of the present inventive concept.

FIG. 15 is a graph illustrating a relationship between a gate signal delay time and a distance from a first gate driving part of FIG. 14 according to an exemplary embodiment of the present inventive concept.

Referring to FIGS. 4, 14, and 15, the display panel 110 may include the first to (N+1)-th dummy data lines DDL1, DDL2, DDL3, DDL4, DDL5, . . . , DDL(N−1), DDLN, and DDL(N+1).

A load of the gate line GL increases according to an increase of the distance from the first gate driving part 631, based on the gate signal GS output from the first gate driving part 631. Therefore, the gate signal delay time increases as the distance from the first gate driving part 631 increases. In addition, the load of the gate line GL increases according to an increase of the distance from the second gate driving part 632, based on the gate signal GS output from the second gate driving part 632. Therefore, the gate signal delay time increases as the distance from the second gate driving part 632 increases.

The gate signal delay time may increase in a non-linear fashion. For example, a slope of the gate signal delay time between the second dummy data line DDL2 and the third dummy data line DDL3 may be less than a slope of the gate signal delay time between the first dummy data line DDL1 and the second dummy data line DDL2.

The timing controlling part 700 may control the output timings of the data signals DS output from the data driving part 200 in consideration of the delay times of the gate signals GS of the areas where the gate line GL and each of the first to (N+1)-th dummy data lines DDL1, DDL2, DDL3, DDL4, DDL5, . . . , DDL(N−3), DDL(N−2), DDL(N−1), DDLN, and DDL(N+1) cross.

Figure 16:
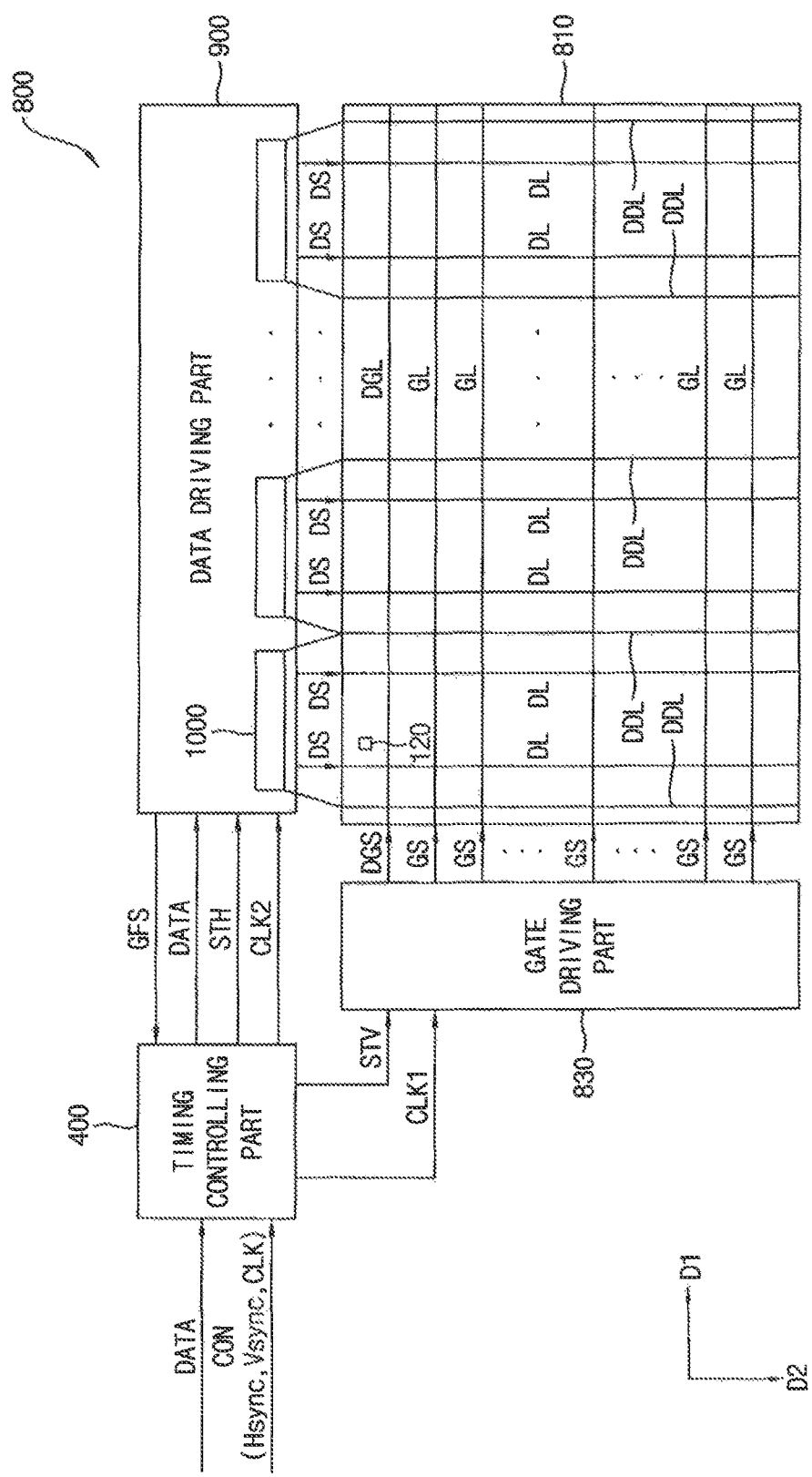
FIG. 16 is a block diagram illustrating a display apparatus according to an exemplary embodiment of the present inventive concept.

FIG. 16 is a block diagram illustrating a display apparatus according to an exemplary embodiment of the present inventive concept.

A display apparatus 800, according to the present exemplary embodiment illustrated in FIG. 16, may be substantially the same as the display apparatus 100 of FIG. 1, except for a display panel 810, a gate driving part 830, and a data driving part 900. Thus, the same reference numerals will be used to refer to same or like parts as those described previously, and any repeat explanations concerning these elements will be omitted.

The display panel 810 receives the data signals DS from the data driving part 900 to display an image. The display panel 810 includes the gate lines GL, the data lines DL, the dummy data lines DDL, the pixels 120, and a dummy gate line DGL. The gate lines GL extend in the first direction D1 and are arranged in the second direction D2 that is substantially perpendicular to the first direction D1. The data lines DL extend in the second direction D2 and are arranged in the first direction D1. Here, the first direction D1 may be substantially parallel to a long side of the display panel 810, and the second direction D2 may be substantially parallel to a short side of the display panel 810. The dummy data lines DDL extend in the second direction D2 and are arranged in the first direction D1. The dummy data lines DDL are formed in areas between the data lines DL. Additionally, two of the dummy data lines DDL may be formed at ends of the display panel 110 with respect to the first direction D1. The dummy gate line DGL is formed between the gate lines GL and the data driving part 900. The dummy gate line DGL extends in the first direction D1.

The gate driving part 830, the data driving part 900, and the timing controlling part 400 may be a display panel driving apparatus for driving the display panel 810.

The gate driving part 830 generates the gate signals GS in response to the vertical start signal STV and the first clock signal CLK1 provided from the timing controlling part 400, and outputs the gate signals GS to the gate lines GL. In addition, the gate driving part 830 outputs a dummy gate signal DGS to the dummy gate line DGL. The dummy gate signal DGS may be substantially the same as the gate signals GS.

The data driving part 900 receives the image data DATA from the timing controlling part 400, generates the data signals DS based on the image data DATA, and outputs the data signals DS to the data lines DL in response to the horizontal start signal STH and the second clock signal CLK2 provided from the timing controlling part 400. The data driving part 900 may include a plurality of data driving integrated circuit parts 1000 which output the data signals DS.

When the dummy gate signal DGS is applied to the dummy gate line DGL, the data driving part 900 may not output the data signals DS to the data lines DL. Thus, the dummy gate line DGL and the dummy gate signal DGS do not influence the image displayed on the display panel 810.

In addition, the data driving part 900 outputs the dummy gate signal GS, of areas where each of the dummy data lines DDL and the dummy gate line GL cross, to the timing controlling part 400, as the gate feedback signals GFS.

The timing controlling part 400 receives the image data DATA and the control signal CON from an outside source (e.g., a host). The control signal CON may include the horizontal synchronous signal Hsync, the vertical synchronous signal Vsync, and the clock signal CLK. The timing controlling part 400 generates the horizontal start signal STH using the horizontal synchronous signal Hsync and outputs the horizontal start signal STH to the data driving part 900. In addition, the timing controlling part 400 generates the vertical start signal STV using the vertical synchronous signal Vsync and outputs the vertical start signal STV to the gate driving part 830. Furthermore, the timing controlling part 400 generates the first clock signal CLK1 and the second clock signal CLK2 using the clock signal CLK, outputs the first clock signal CLK1 to the gate driving part 830, and outputs the second clock signal CLK2 to the data driving part 900.

The timing controlling part 400 receives the gate feedback signals GFS, and controls output timings of the data driving part 900 based on the gate feedback signals GFS. For example, the timing controlling part 400 may include the gate delay calculating part 410, the data output timing setting part 420, and the clock signal outputting part 430 of FIG. 7.

Figure 17:
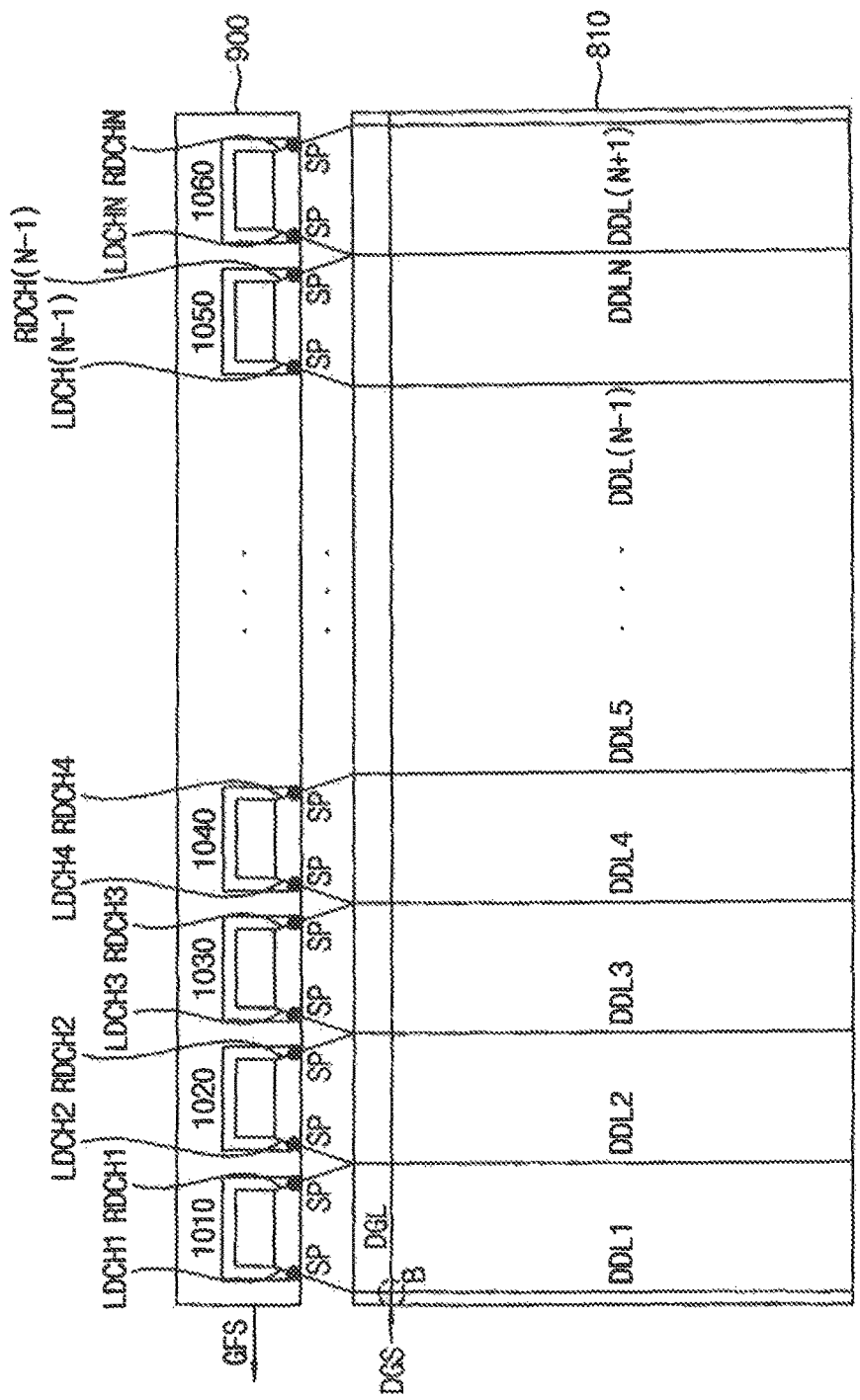
FIG. 17 is a block diagram illustrating a display panel and a data driving part of FIG. 16 according to an exemplary embodiment of the present inventive concept.

FIG. 17 is a block diagram illustrating a display panel and a data driving part of FIG. 16 according to an exemplary embodiment of the present inventive concept.

Referring to FIGS. 16 and 17, the dummy data lines DDL include the first to (N+1)-th dummy data lines DDL1, DDL2, DDL3, DDL4, DDL5, . . . , DDL(N−1), DDLN, and DDL(N+1).

The data driving integrated circuit parts 1000 include first to N-th data driving integrated circuit parts 1010, 1020, 1030, 1040, 1050, and 1060. Each of the first to N-th data driving integrated circuit parts 1010, 1020, 1030, 1040, 1050, and 1060 may be substantially the same as the data driving integrated circuit part 300 of FIG. 3.

Thus, a first data driving integrated circuit part 1010 includes the first left dummy data channel LDCH1 and the first right dummy data channel RDCH1. The sensing pin SP is formed in each of the first left dummy data channel LDCH1 and the first right dummy data channel RDCH1. The first left dummy data channel LDCH1 is connected to the first dummy data line DDL1. The first right dummy data channel RDCH1 is connected to the second dummy data line DDL2.

A second data driving integrated circuit part 1020 includes the second left dummy data channel LDCH2 and the second right dummy data channel RDCH2. The sensing pin SP is formed in each of the second left dummy data channel LDCH2 and the second right dummy data channel RDCH2. The second left dummy data channel LDCH2 is connected to the second dummy data line DDL2. The second right dummy data channel RDCH2 is connected to the third dummy data line DDL3.

A third data driving integrated circuit part 1030 includes the third left dummy data channel LDCH3 and the third right dummy data channel RDCH3. The sensing pin SP is formed in each of the third left dummy data channel LDCH3 and the third right dummy data channel RDCH3. The third left dummy data channel LDCH3 is connected to the third dummy data line DDL3. The third right dummy data channel RDCH3 is connected to the fourth dummy data line DDL4.

A fourth data driving integrated circuit part 1040 includes the fourth left dummy data channel LDCH4 and the fourth right dummy data channel RDCH4. The sensing pin SP is formed in each of the fourth left dummy data channel LDCH4 and the fourth right dummy data channel RDCH4. The fourth left dummy data channel LDCH4 is connected to the fourth dummy data line DDL4. The fourth right dummy data channel RDCH4 is connected to the fifth dummy data line DDL5.

An (N−1)-th data driving integrated circuit part 1050 includes the (N−1)-th left dummy data channel LDCH(N−1) and the (N−1)-th right dummy data channel RDCH(N−1). The sensing pin SP is formed in each of the (N−1)-th left dummy data channel LDCH(N−1) and the (N−1)-th right dummy data channel RDCH(N−1). The (N−1)-th left dummy data channel LDCH(N−1) is connected to the (N−1)-th dummy data line DDL(N−1). The (N−1)-th right dummy data channel RDCH(N−1) is connected to the N-th dummy data line DDLN.

An N-th data driving integrated circuit part 1060 includes the N-th left dummy data channel LDCHN and the N-th right dummy data channel RDCHN. The sensing pin SP is formed in each of the N-th left dummy data channel LDCHN and the N-th right dummy data channel RDCHN. The N-th left dummy data channel LDCHN is connected to the N-th dummy data line DDLN. The N-th right dummy data channel RDCHN is connected to the (N+1)-th dummy data line DDL(N+1).

Figure 18:
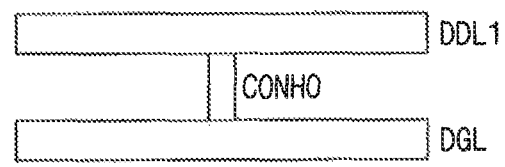
FIG. 18 is a cross-sectional view of a portion 'B' of the display panel of FIG. 17 according to an exemplary embodiment of the present inventive concept.

FIG. 18 is a cross-sectional view of a portion 'B' of the display panel of FIG. 17 according to an exemplary embodiment of the present inventive concept.

Referring to FIGS. 16 to 18, the contact hole CONHO is formed between the dummy gate line DGL and the first dummy data line DDL1. In substantially the same manner, a contact hole is formed between the dummy gate line DGL and each of the second to (N+1)-th dummy data lines DDL2, DDL3, DDL4, DDL5, . . . , DDL(N−1), DDLN, and DDL(N+1).

Thus, the data driving part 900 may receive the gate signals GS of the areas where the dummy gate line DGL and each of the first to (N+1)-th dummy data lines DDL1, DDL2, DDL3, DDL4, DDL5, . . . , DDL(N−1), DDLN, and DDL(N+1) cross, through the sensing pins SP, and may output the gate signals GS as the gate feedback signals GFS.

A time when the dummy gate signal DGS transitions from a low level to a high level increases as a load of the dummy gate line DGL increases. Thus, a delay time of the dummy gate signal DGS increases as a distance between the gate driving part 830 and the dummy gate line DGL increases.

Figure 19:
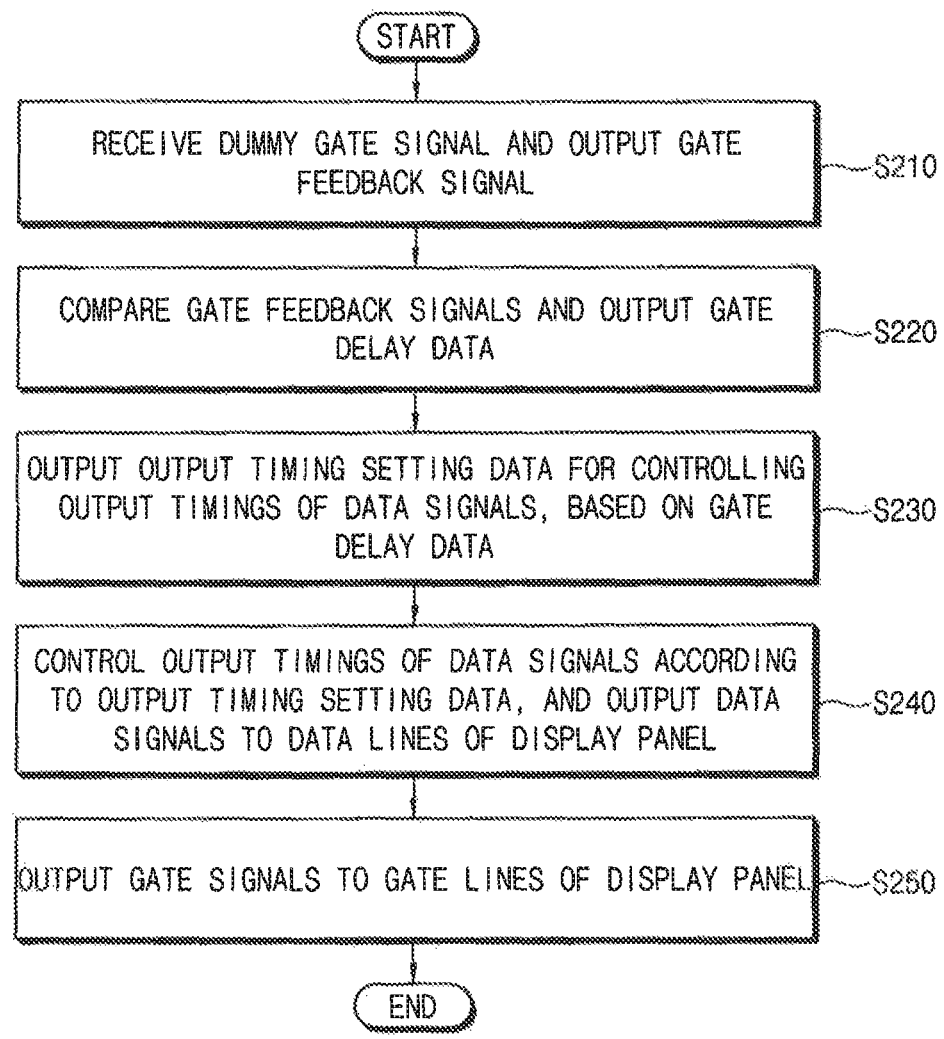
FIG. 19 is a flowchart illustrating a method of driving the display apparatus of FIG. 16 according to an exemplary embodiment of the present inventive concept.

FIG. 19 is a flowchart illustrating a method of driving the display apparatus of FIG. 16 according to an exemplary embodiment of the present inventive concept.

Referring to FIGS. 3, 4, and 16 to 19, the dummy gate signal DGS is received and the gate feedback signals GFS are output (operation S210). For example, the data driving part 900 receives the gate signals GS of the areas where the dummy gate line DGL and each of the first to (N+1)-th dummy data lines DDL1, DDL2, DDL3, DDL4, DDL5, . . . , DDL(N−1), DDLN, and DDL(N+1) cross, through the sensing pins SP, and outputs the gate signals GS as the gate feedback signals GFS.

The gate feedback signals GFS are compared and the gate delay data GDD is output (operation S220). For example, the gate delay calculating part 410 receives the gate feedback signals GFS output from the data driving part 900. The gate delay calculating part 410 compares the gate feedback signals GFS, and calculates the delay times of the dummy gate signal DGS of the dummy gate line DGL which crosses with each of the first to (N+1)-th dummy data lines DDL1, DDL2, DDL3, DDL4, DDL5, . . . , DDL(N−1), DDLN, and DDL(N+1). The gate delay calculating part 410 outputs the gate delay data GDD indicating the delay times of the dummy gate signal DGS.

The output timing setting data OTSD, for controlling the output timings of the data signals DS based on the gate delay data GDD, is output (operation S230). For example, the data output timing setting part 420 receives the gate delay data GDD from the gate delay calculating part 410. According to the gate delay data GDD, the data output timing setting part 420 outputs the output timing setting data OTSD for automatically setting the output timings of the first to K-th data signals DS1, DS2, ..., DS(K/2), ..., and DSK output from the first to K-th channels CH1, CH2, ..., CH(K/2), ..., and CHK, respectively, of each of the data driving integrated circuit parts 1000 included in the data driving part 900.

The output timings of the data signals DS are controlled according to the output timing setting data OTSD, and the data signals DS are output to the data lines DL of the display panel 810 (operation S240). For example, the clock outputting part 430 receives the output timing setting data OTSD from the data output timing setting part 420. The clock outputting part 430 outputs the second clock signal CLK2 to control the output timing of the data driving part 900 according to the output timing setting data OTSD. The data driving part 900 receives the image data DATA from the timing controlling part 400, generates the data signals DS based on the image data DATA, and outputs the data signals DS to the data lines DL in response to the horizontal start signal STH and the second clock signal CLK2 provided from the timing controlling part 400.

The gate signals GS are output to the gate lines GL of the display panel 810 (operation S250). For example, the gate driving part 830 generates the gate signals GS in response to the vertical start signal STV and the first clock signal CLK1 provided from the timing controlling part 400, and outputs the gate signals GS to the gate lines GL.

As described above, according to exemplary embodiments of the inventive concept, the data driving part 200 (e.g., as illustrated in FIGS. 1 and 14) may control the output timings of the data signals DS output from the data driving part 200, in consideration of the delay times of the gate signal GS of the areas where the gate line GL and each of the first to (N+1)-th dummy data lines DDL1, DDL2, DDL3, DDL4, DDL5, ..., DDL(N−1), DDLN, and DDL(N+1) cross. In addition, the data driving part 900 (e.g., as illustrated in FIG. 16) may control the output timings of the data signals DS output from the data driving part 900, in consideration of the delay times of the dummy gate signal DGS of the areas where the dummy gate line DGL and each of the first to (N+1)-th dummy data lines DDL1, DDL2, DDL3, DDL4, DDL5, ..., DDL(N−1), DDLN, and DDL(N+1) cross.

In other words, output timings of data signals output from a data driving part of a display apparatus may be controlled in consideration of a delay time of a gate signal. Therefore, a decrease of a charge rate of a pixel voltage charged in a pixel may be prevented. Thus, display quality of the display apparatus may be increased.

The present inventive concept may be applied to any electronic device having a display apparatus. For example, the present inventive concept may be applied to a television, a computer monitor, a laptop, a digital camera, a cellular phone, a smart phone, a tablet Personal Computer (PC), a smart pad, a Personal Digital Assistant (PDA), a Portable Multimedia Player (PMP), an MP3 player, a navigation system, a camcorder, a portable game console, etc.

While the present inventive concept has been shown and described with reference to exemplary embodiments thereof, it will be apparent to those of ordinary skill in the art that various modifications in form and details may be made thereto without materially departing from the spirit and scope of the present inventive concept as defined by the following claims.

What is claimed is:

1. A display apparatus comprising:
   a display panel configured to display an image, and including a gate line and data lines;
   a gate driving part configured to output a gate signal to the gate line; and
   a data driving part comprising a plurality of data driving integrated circuit parts,
   wherein each of the plurality of data driving integrated circuit parts comprises channels, configured to output data signals to the data lines, and a dummy data channel,
   a sensing pin, configured to receive the gate signal, is formed in each dummy data channel,
   the dummy data channel comprises a first side dummy data channel disposed adjacent to a first side of the channels, and a second side dummy data channel disposed adjacent to a second side of the channels that is opposite to the first side,
   the display panel comprises a dummy data line electrically connected to the dummy data channel of each of the plurality of data driving integrated circuit parts,
   the plurality of data driving integrated circuit parts comprises first to N-th (where N is a natural number not less than two) data driving integrated circuit parts, and
   the second side dummy data channel of the first data driving integrated circuit part and the first side dummy data channel of the second data driving integrated circuit part are connected to the same dummy data line of the display panel.

2. The display apparatus of claim 1, wherein the sensing pin is formed in each of the first side dummy data channel and the second side dummy data channel.

3. The display apparatus of claim 2, wherein the dummy data line comprises first to (N+1)-th dummy data lines.

4. The display apparatus of claim 3, wherein the first dummy data line is electrically connected to the first side dummy data channel of the first data driving integrated circuit part, and
   the second dummy data line, which is adjacent to the first dummy data line, is electrically connected to the second side dummy data channel of the first data driving integrated circuit part and the first side dummy data channel of the second data driving integrated circuit part, which is adjacent to the first data driving integrated circuit part.

5. The display apparatus of claim 4, wherein the (N+1)-th dummy data line is electrically connected to the second side dummy data channel of the N-th data driving integrated circuit part.

6. The display apparatus of claim 3, wherein the data driving part receives the gate signal of areas where each of the first to (N+1)-th dummy data lines and the gate line cross, through the sensing pin, as received gate signals.

7. The display apparatus of claim 6, wherein the data driving part outputs the received gate signals as gate feedback signals.

8. The display apparatus of claim 7, further comprising:
   a gate delay calculating part configured to compare the gate feedback signals, calculate delay times of the received gate signals, and output gate delay data.

9. The display apparatus of claim 8, further comprising:
   a data output timing setting part configured to output timing setting data, which automatically sets output timings of the data signals, according to the gate delay data.

10. The display apparatus of claim 9, further comprising:
a timing controlling part configured to control a timing of the gate driving part and a timing of the data driving part,
wherein the gate delay calculating part and the data output timing setting part are included in the timing controlling part.

11. The display apparatus of claim 10, wherein the timing controlling part controls the output timings of the data signals output from the channels of the plurality of data driving integrated circuits parts, using delay times of the gate signal of areas where the gate line and two adjacent dummy data lines, connected to each of the plurality of data driving integrated circuit parts, cross.

12. The display apparatus of claim 10, wherein the timing controlling part controls output timings of the data signals output from each of the plurality of data driving integrated circuit parts, using the delay times of the received gate signals.

13. The display apparatus of claim 1, wherein each of the plurality of data driving integrated circuit parts comprises first to K-th (where K is a natural number not less than four) channels configured to output first to K-th data signals, respectively,
each of the plurality of data driving integrated circuit parts sequentially outputs the first to (K/2)-th data signals through the first to (K/2)-th channels, respectively, and
each of the plurality of data driving integrated circuit parts sequentially outputs the K-th to (K/2)-th data signals through the K-th to (K/2)-th channels, respectively.

14. The display apparatus of claim 1, wherein each of the plurality of data driving integrated circuit parts comprises first to K-th (where K is a natural number not less than four) channels configured to output first to K-th data signals, respectively, and
each of the plurality of data driving integrated circuit parts sequentially outputs the K-th to first data signals through the K-th to first channels, respectively.

15. The display apparatus of claim 1, wherein each of the plurality of data driving integrated circuit parts comprises a plurality of channel groups, and output timings of data signals output from each of the plurality of channel groups are different from one another.

16. The display apparatus of claim 1, wherein the display panel further comprises a dummy gate line disposed between the data driving part and the gate line,
the gate driving part is further configured to output a dummy gate signal to the dummy gate line, and
the data driving part is configured to receive the dummy gate signal through the sensing pin of each of the plurality of data driving integrated circuit parts to measure a delay time of the dummy gate signal.

* * * * *